US007013223B1

(12) United States Patent
Zhang et al.

(10) Patent No.: US 7,013,223 B1
(45) Date of Patent: Mar. 14, 2006

(54) METHOD AND APPARATUS FOR ANALYZING PERFORMANCE OF A HYDRAULIC PUMP

(75) Inventors: Qin Zhang, Champaign, IL (US); Yingjie Gao, Qinhuangdao (CN); Xiangdong Kong, Qinhuangdao (CN)

(73) Assignee: The Board of Trustees of the University of Illinois, Urbana, IL (US)

( * ) Notice: Subject to any disclaimer, the term of this patent is extended or adjusted under 35 U.S.C. 154(b) by 239 days.

(21) Appl. No.: 10/671,434

(22) Filed: Sep. 24, 2003

Related U.S. Application Data

(60) Provisional application No. 60/413,328, filed on Sep. 25, 2002.

(51) Int. Cl.
*G06F 11/30* (2006.01)

(52) U.S. Cl. ............................ 702/34; 73/168; 417/53

(58) Field of Classification Search .................. 417/53; 702/33, 34
See application file for complete search history.

(56) References Cited

U.S. PATENT DOCUMENTS 4,094,191 A * 6/1978 Goetsch et al. ............ 73/118.1
4,489,551 A 12/1984 Watanabe et al.
5,499,538 A * 3/1996 Glidewell et al. ........ 73/119 A
5,720,598 A * 2/1998 de Chizzelle ................ 417/53
6,055,851 A 5/2000 Tanaka et al.
6,087,945 A 7/2000 Yasuda
6,697,741 B1 * 2/2004 Yu et al. ........................ 702/33
6,901,791 B1 * 6/2005 Frenz et al. .............. 73/119 A

FOREIGN PATENT DOCUMENTS

JP 11-085266 3/1999
JP 2000-241306 9/2000

OTHER PUBLICATIONS

Angeli et al., "An expert system approach to fault diagnosis in hydraulic systems", Expert System, vol. 12 No. 4, pp., 323-329 (1995).

Borras, D., M. Castilla, N. Moreno, and J.C. Montano, 2001. Wavelet Neural Structure: A New Tool For Diagnostic of Power Disturbances. *IEEE Transactions on Industrial Applications*, 37(1): 184-190 (2001).

Boulahbal, D., M.F. Golnaraghi, and F. Ismail, "Amplitude and Phase Wavelet Maps for the Detection of Cracks in Gear Systems", *Mechanical Systems and Signal Processing*, 13(3): 423-436 (1999), www.idealibrary.com.

Choi, H.I, and W.J. Williams, "Improved Time-Frequency, Representation of Multicomponent Signals Using Exponential Kemels", *IEEE Transactions on Acoustics, Speech, and Signal Processing*, 37(6): 862-871 (1989).

Cohen, L., "Time-Frequency Distributions—A Review. *Proceedings of IEEE Transactions on Acostics, Speech, and Signal Processing*", 77(7): 941-981 (1989).

Dalpiaz, G., A. Rivola, and R. Rubini, "Effectiveness and Sensitivity of Vibration Processing Techniques for Local Fault Detection n Gears", *Mechanical Systems and Signal Processing*, 14(3): 387-412 (2000), www.idealibrary.com.

(Continued)

*Primary Examiner*—Michael Koczo, Jr.
(74) *Attorney, Agent, or Firm*—Greer, Burns & Crain, Ltd.

(57) ABSTRACT

A method and apparatus for analyzing a hydraulic pump in real-time. A pressure signal is provided representing a discharge pressure of the hydraulic pump, and the pressure signal is decomposed into a plurality of levels. Each of the plurality of levels has at least one frequency band. A feature pressure signal is located in at least one of the frequency bands and compared to a reference wavelet to determine if a fault exists in the hydraulic pump and/or a type of defect in the hydraulic pump.

18 Claims, 11 Drawing Sheets

OTHER PUBLICATIONS

Daubechies, I., A Grossmann, and Y. Meyer, "Painless Nonorthogonal Expansions", *Journal of Mathematical Physics*, 27(5): 293-309 (1986).

Deng, X., Q. Wang, and V. Giurgiutiu, "Structural health monitoring using active sensors and wavelet transforms", *Proceedings of SPIE*, vol. 3668, Newport Beach, CA, pp. 363-370 (1999).

Gabor, D., "Theory of Communication", *Journal of Institution on Electronic Engineering*, 93:429-441 (1945).

Gao, Y., Q. Zhang, Wavelet Analysis for Piston Pump Fault Diagnosis, IFPE Conference, vol. No. 7, pp. 183-187, 2002.

Graps, A., "An Introduction to Wavelets", *IEEE Computational Science & Engineering*, 2: 50-61 (1995).

Guo, H., J.A. Crossman, Y.L. Murphey, and M. Coleman, "Automotive Signal Diagnostics Using Wavelets and Machine Learning", *IEEE Transactions on Vehicular Technology*, 49(5): 1650-1662 (2000).

Guttler, S. and H. Kantz, "The Auto-Synchronized Wavelet Transform Analysis for Automatic Acoustic Quality Contro", *Journal of Sound and Vibration*, 243(1): 3-22 (2001), www.idealibrary.com.

He, D., X. Wang, A. Babayan, and Q. Zhang, "Intelligent Equipment Health diagnosis and Prognosis Using Wavelets: The Status of Research and Industrial Applications", In: Zhang, Q. (ed), *Proceedings of Automation Technology for Off-road Equipment*, ASAE, SI. Joseph, MI, pp: 77-88 (2002).

Kasashima, N., K. Mori, G.H. Ruiz, and N. Taniguchi, "Online Failure Detection in Face Milling Using Discrete Wavelet Transform", *Annals of the CIRP*, 44(1): 483. (1995).

Li, X., Y. Yao, and Z. Yuan, "On-line Tool Monitoring System with Fuzzy Neural Network", *Journal of Intelligent Manufacturing*, 8:271-276 (1997).

Lin, J. and L. Qu, "Feature Extraction Based on Morlet Wavelet and its Application for Mechanical Fault Diagnosis", *Journal of Sound and Vibration*, 234(1): 135-148 (2000).

Liu B., S.F. Ling, and R. Gribonval, "Bearing Failure Detection Using Matching Pursuit", *NDT& E International*, 35: 255-262 (2002).

Liu et al., "Pulsating parameter method for fault diagnosis for a hydraulic pump", Proceeding of IECON'91, pp. 2145-2150 (1991).

Mallat, S., "A Theory for Multiresolution Signal Decomposition: The Wavelet Representation", *IEEE Transactions on Pattern Analysis and Machine Intelligence*, 11: 674-693 (1989).

Mitchell, "Research into a sensor-based diagnostic maintenance expert system for the hydraulic subsystem of a continuous mining machine", IEEE Trans. on Industry Application, vol. 5, pp. 1192-1199 (1991).

Newland, "Wavelet analysis of vibration. Part 1: Theory." Trans. ASME Journal of Vibration and Acoustics, vol. 116, pp. 417-425 (1994).

Nikolaou N.G., and I.A. Antoniadis, "Rolling Element Bearing Fault Diagnosis Using Wavelet Packets", *NDT&E International*, 35: 197-205 (2002).

Paya, B.A., I.I. Esat and M.N.M. Badi, "Artificial Neural Network Based Fault Diagnostics of Rotating Machinery Using Wavelet Transforms as a Preprocessors", *Mechanical Systems and Signal Processing*, 11(5): 751-765 (1997).

P.W. Tse and S.H. Ling, "Can Wavelet Transmorms Used for Data Compression Equally Suitable for the Use of Machine Fault Diagnosis?", *Proceedings of ASME 2001 Design Engineering technical Conference*, Sep. 9-12, 2001, Pittsburgh, PA, pp. 2911-2918.

R.J Alonso, and M. Noori, "Comparative Study Between CWT and STFT For Online Health Monitoring Applications in Systems under random Excitation", *Proceedings of ASME 2001 Design Engineering Conference*, Sep. 9-12, 2001, Pittsburgh, PA, pp. 15-22.

Rioul, O., and M. Vetterli, "Wavelets and Signal Processing", *IEEE Signal Processing Magazine*, 8(4): 14-38 (1991).

Shibata, K., A. Takahashi, and T. Shirai, "Fault Diagnosis of Rotating Machinery Through Visualization of Sound Signals", *Mechanical Systems and Signal Processing*, 14(2):229-241 (2000).

Szu et al., "Wavelet transform and neural networks for compression and recognition", Neural Networks, vol. 9, No. 4, pp. 695-708 (1996).

Tansel, I.N., C. Mekdeci, and C. McLaughlin, "Detection of Tool Failure in End Milling with Wavelet Transformations and Neural Networks", *International Journal of Machine Tools Manufacturing*, 35(8): 1137-1147 (1995).

Thomas, J.H. and B. Dubuisson, "A Diagnostic Method using Wavelet Networks and its Application to engine Knock Detection", *IEEE International Conference on Systems, Man and Cybernetics*, pp. 244-249 (1996).

Vetterli et al., "Wavelets and filter bank: theory and design", IEEE Trans. on Signal Processing, vol. 40, No. 9, pp. 2207-2232 (1992).

Wang et al., "Application of the wavelets to gearbox vibration signals for fault detection", The Journal of Sound and Vibration, vol. 192, No. 5, pp. 927-939 (1996).

Wang, W.J. and P.D. McFadden, "Early Detection of Gear Failure by Vibration Analysis. I. Calculation of the Time-Frequency Distribution", *Mechanical Systems & Signal Processing*, 7(3): 193-203 (1993).

Winger, E.P., "On the Quantum Correction for Thermodynamic Equilibrium", *Physics Review*, 40: 749-759 (1932).

Wu, Y. and R. Due, "Feature Extraction and Assessment using Wavelets for Monitoring of Machining Process", *Mechanical Systems and Signal Processing*, 10(1):29-53 (1996).

Y. Gao, Q. Zhang, and X. Kong, "Wavelet-Based Pressure Analysis for Hydraulic Pump Health Diagnosis", Transactions of the ASAE, vol. 46(4), pp 969-976 (2003).

Zhao, J., B. Chen, and J. Shen, "Multidimensional Non-Orthogonal Wavelet-Sigmoid Basis Function Neural Network for Dynamic Process Fault Detection", *Computers and Chemical Engineering*, 23: 83-92 (1998).

Webster Product Overview Brochure, pp 1-8 (May 2001).

Webtec Brochure, 2001, pp 1-4.

Webtec Brochure, 2001, pp 1-40.

* cited by examiner

| FIG. 4A |
|---|
| FIG. 4B |

| |
|---|
| FIG. 4A |
| FIG. 4B |

METHOD AND APPARATUS FOR ANALYZING PERFORMANCE OF A HYDRAULIC PUMP

PRIORITY CLAIM

This application claims priority of U.S. Provisional Application Ser. No. 60/413,328, filed Sep. 25, 2002.

FIELD OF THE INVENTION

The present invention relates generally to the field of hydraulic system analysis.

BACKGROUND OF THE INVENTION

Real-time health assessment for hydraulic pumps is a desired function due to, among other things, the high cost of unexpected failure of hydraulic systems. Typical hydraulic systems include both hydraulic-mechanical and electronic components, but most faults occur in the hydraulic-mechanical components. Common hydraulic system faults include, but are not limited to distortion, stress rupture, erosion, rubbing abrasion, impacting rupture, heat stress, and hot distortion. Furthermore, a hydraulic transmission and control system has its own special faults, such as oil pollution, leakage, air erosion, hydraulic blocking, pipe resonance, distortion of electrical signal, noise, and system surging.

Many existing fault diagnosis methods for hydraulic systems are based on mechanical system parameters, with feature signals such as vibration, acoustic noise, and temperatures. However, because these parameters are indirect measures of hydraulic system operating conditions, and due to the multiple motion forms of hydraulic-mechanical components and the interference of multiple components via the hydraulic lines, a more complicated process is required to use these indirect parameters to monitor a state of the hydraulic system sensitively and accurately.

For example, operation status of a hydraulic pump, a core component in a hydraulic system, directly influences the reliability of the hydraulic system. In piston-type hydraulic pumps, for example, common faults include, but are not limited to, worn pistons, swash plates, and distributing discs, bearing and spring failures, and loose piston shoes. These faults are often reflected in the pump discharge pressure, but are normally buried in the pulsation pressure signals. In addition, there are other noise sources, such as air erosion, hydraulic blocking, pipe resonance and leakage, etc. reflected in the pump discharge pressure. These noises normally result in a very low signal-to-noise ratio in the pump discharge pressure signals. Conventional health diagnosis methods, such as limit checking, spectrum analysis, and logic reasoning, require a distinguishable feature signal to detect faults, but these methods heretofore have not been sensitive or robust enough to reliably detect pump faults.

To obtain more reliable pump health diagnosis results, vibration analysis methods based on spectral analysis have been disclosed. In an exemplary vibration-based diagnosis method, an accelerometer is installed on the shell of the pump, and fault diagnosis is performed by spectral analysis of the shell vibration signals. Diagnosis methods may include, for example: (1) calculating an over-limit mean square amplitude of the vibration, in which a fault state is diagnosed in the mean square value exceeds a preset threshold; (2) characteristic frequency analysis, in which the frequency spectrum of obtained vibration signals is compared with that of a normal vibration signal, where the fault signal and/or pattern is identified based on differences between the evaluating spectrum and the normal spectrum; and (3) time-frequency domain analysis, in which feature patterns are extracted based on signal distributions on both time and frequency domain signals to diagnose faults of the system.

SUMMARY OF THE INVENTION

The present invention provides a method and apparatus for analyzing a hydraulic pump in real-time. A pressure signal is provided representing a discharge pressure of the hydraulic pump, and the pressure signal is decomposed into a plurality of levels. Each of the plurality of levels has at least one frequency band. A feature pressure signal is located in at least one of the frequency bands and compared to a reference wavelet to determine if a fault exists in the hydraulic pump and/or a type of defect in the hydraulic

DETAILED DESCRIPTION OF THE INVENTION

Figure 1:
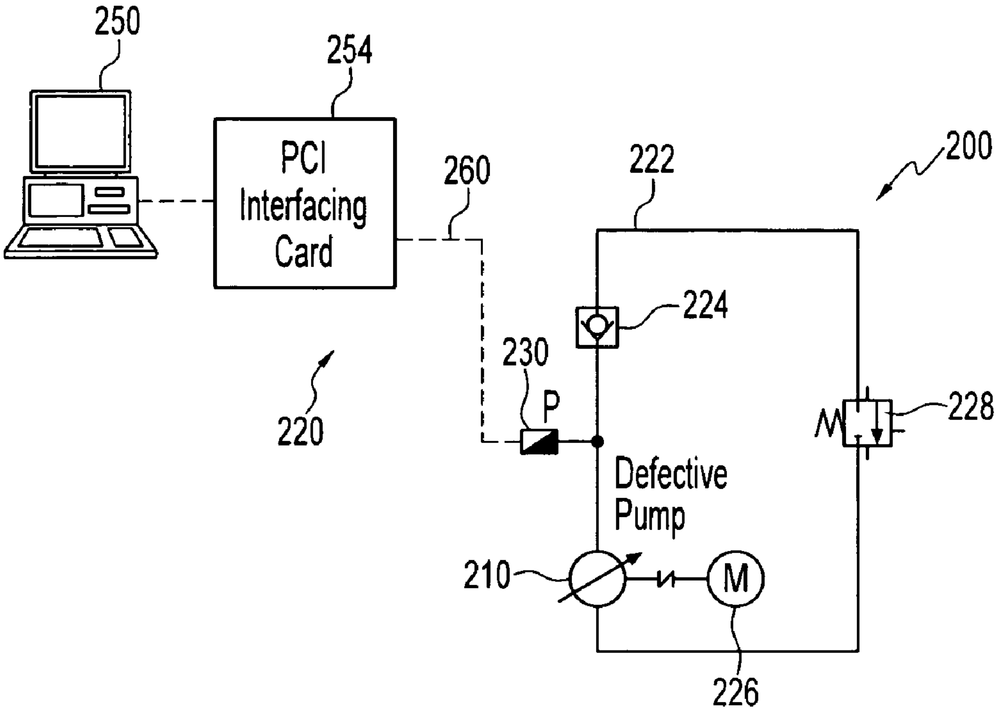
FIG. 1 is a schematic of a hydraulic system having an apparatus for analyzing a hydraulic pump according to an embodiment of the present invention.

Fault diagnosis methods based on the vibration signals measured from the pump shell result in significant vibration effects, including environmental effects, which influence the quality of the obtained signals. More particularly, such signals consist of a series of harmonic frequencies and contain high background noises, making it difficult to distinguish feature signals of pump faults from the vibration signals. Furthermore, these methods are normally based on spectrum analysis that uses Fourier transform (FT), short-time Fourier transform (STFT), and/or time sequence analysis (TSA). Because these methods process signals in the frequency domain or time domain signals alone, they have limitations in practical applications.

The present invention provides, among other things, a fault diagnosis method and apparatus that assesses, in real-time, pump health conditions and fault symptoms based on pump discharge pressure. Accordingly, preferred embodiments of the present invention can accurately predict a possibility of pump failure before such failure occurs, thus substantially reducing the likelihood of unanticipated hydraulic equipment failure and resulting downtime. By diagnosing and correcting a fault before it worsens to the point of pump and/or system failure, more expensive repairs or maintenance may be reduced. A lifetime of a pump and associated hydraulic system can be predicted based on a diagnosed fault. Reliability of systems having hydraulic pumps can be improved.

A preferred method of the present invention analyzes a hydraulic pump in real-time by measuring discharge pressure of the pump, and applies wavelet analysis to the measured discharge pressure to diagnose a fault. Generally, the wavelet analysis decomposes a pressure signal into a number of windows for evaluation, and compares one or more feature pressure signals within those windows to one or more reference wavelets. Reference wavelets are selected standard wavelets that correspond to a normally functioning hydraulic pump and/or hydraulic pumps having specific faults. By comparing the feature pressure signals to the reference wavelets, determinations can be made regarding the condition of the pump and the hydraulic system.

More particularly, the preferred method provides a pressure signal representing the discharge pressure of the pump, and decomposes the pressure signal into a number of levels. Each of the levels has at least one frequency band. At least one feature pressure signal within one of the frequency bands is located and compared to at least one reference wavelet. The reference wavelet relates to a certain characteristic, and comparing the feature pressure signal and the reference wavelet in particular frequency bands can determine whether the characteristic exists in the hydraulic pump. By directly measuring the pump discharge pressure, environmental noise is significantly reduced.

A preferred embodiment for analyzing a hydraulic pump includes a pressure sensor in fluid communication with a discharge port of the pump. A processor is coupled to the pressure sensor, and is configured to decompose a pressure signal from the pressure sensor into a number of levels, where each of the levels has at least one frequency band. The processor is configured to compare one or more feature pressure signals within at least one of the frequency bands to one or more reference wavelets to determine whether a characteristic exists. An alarm signal generator connected to the processor preferably is provided to generate an alarm signal indicating a pump fault, if a pump fault is detected. This alarm signal may, for example, alert a user of potential pump problems, request an on-site inspection, or order a replacement pump or pump component. The processor may be associated with one or more computers for on-site and/or remote monitoring, processing, and/or analysis.

Preferably, an embodiment of the present invention can be integrated into existing hydraulic pumps or systems without significant hardware modification. A hydraulic system is also provided having a hydraulic pump and an apparatus for analyzing the hydraulic pump.

Referring now to the drawings, FIG. 1 shows a hydraulic system 200 having a hydraulic pump 210 and an analyzing apparatus 220 for the hydraulic pump according to an exemplary embodiment of the present invention. An exemplary type of the hydraulic pump 210 is an axial piston fixed-displacement hydraulic pump. However, many other types of hydraulic pumps may be used. In addition to the hydraulic pump 210, the hydraulic system 200 includes various other hydraulic, hydraulic-mechanical, and/or electronic components, such as, but not limited to, a number of fluid passages 222, a check valve 224, a motor 226 for the hydraulic pump, and a load for the hydraulic system, such as a relief valve 228.

Figure 2:
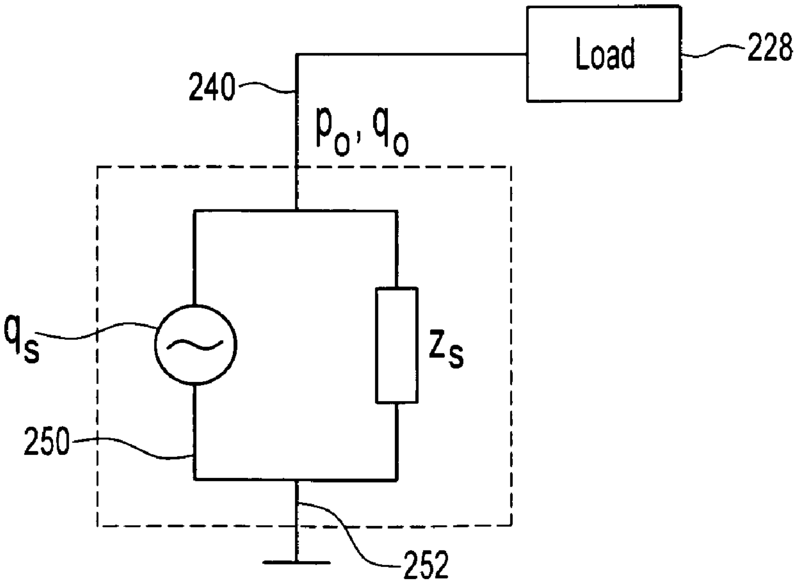
FIG. 2 is a frequency-domain pulsating model of an axial piston pump.

The analyzing apparatus 220 includes a pressure sensor 230 mounted onto or otherwise integrated into the hydraulic system 200 and placed in fluid communication with a discharge port 240 of the hydraulic pump 210 (FIG. 2). The pressure sensor 230 directly monitors the discharge pressure from the hydraulic pump 210. For example, the pressure sensor 230 may be placed downstream of the check valve 224. For example only, the pressure sensor 230 may be an Omega PX01C1-200G5T sensor, though others may be used. The pressure sensor 230 may have a range, for example, of 0–10 MPa and a bandwidth of 0–20 kHz, though other ranges and bandwidths are possible.

In a preferred embodiment, a signal from the pressure sensor 230 is transmitted to a suitable processor 250 via a suitable communication path 260, which may be wired or wireless, and may or may not be part of a larger network. The processor 250, which is configured to analyze the signal, may be embodied in a computer having a Peripheral Connection Interface (PCI) card 254 for connecting to the pressure sensor 230. It is also contemplated that other types of connections, boards, or cards may be used, or alternatively that the processor 250 may be a stand-alone device configured to perform analysis of the provided signal according to the present invention. Preferably, the processor 250 samples the signal from the pressure sensor 230 at discrete times, as a non-limiting example 500 Hz, to provide a pressure signal representative of the discharge pressure of the hydraulic pump 210.

According to a preferred method, analysis of the hydraulic pump 210 can be performed by analyzing only the measured discharge pressure of the hydraulic pump. A reason why this is possible is explained with reference to an exemplary, non-limiting model of the hydraulic pump 210 in FIG. 2, shown by example as a piston hydraulic pump connected to the load 228. In FIG. 2, all of the parameters are presented in the frequency domain. The hydraulic pump 210 in this embodiment is a positive displacement pump, which fills a cylinder 250 with hydraulic fluid when a piston 252 retracts and discharges the pressurized fluid when the piston extends. The most common defects in the hydraulic pump 210 are worn swash plates, pistons/cylinders, and piston shoes, loose piston shoes, and spring and bearing failure. Other defects are possible as well.

The defects of the hydraulic pump 210 are reflected within certain frequency bands of pulsation pressure of the discharged fluid. Because the pulsation of discharge pressure is closely related to the flow pulsation, the following discharge flow pulsation model serves as a base for an exemplary pressure pulsation analysis.

$$\begin{aligned} q_o &= q_s - q_l \\ &= \bar{q}_s + A|\sin\omega t| - q_l \end{aligned} \tag{1}$$

where, $q_o$ is the pump discharge flow, $q_s$ is the rational discharge flow (discharge flow in normal operation), $\bar{q}_s$ is the average pump discharge flow, A is the amplitude of flow pulsation, and $q_1$ is total leakage of the hydraulic pump 210.

The pump leakage, a function of the pump discharge pressure, plays an important role in the dynamic behavior of the pump discharge flow pulsation, and is defined as follows.

$$q_l = \overline{q}_l\sqrt{\frac{p_o}{\overline{p}_o}} \approx \overline{q}_l + \frac{\overline{q}_l}{2\overline{p}_o}(p_o - \overline{p}_o) \tag{2}$$

where $\overline{q}_1$ is the average pump leakage, $p_o$ is the pump discharge pressure, and $\overline{p}_0$ is the average pump discharge pressure. Equations (1) and (2) result in the following discharge flow pulsation model.

$$q_o = q_s - q_l = \overline{q}_s + A|\sin\omega t| - \overline{q}_l - \frac{\overline{q}_l}{2\overline{p}_o}(p_o - \overline{p}_o) \tag{3}$$

To describe flow variations about the mean, Equation (3) can be rewritten as:

$$\Delta q_o = (q_o - \overline{q}_o) = (q_s - \overline{q}_s) - (q_l - \overline{q}_l) = \Delta q_s - \frac{\overline{q}_l}{2\overline{p}_o}\Delta p_o \tag{4}$$

The resulting pulsation model indicates that the discharge pressure fluctuation is affected by the pump discharge flow pulsation and flow fluctuation frequency, as well as pump leakage. Rewriting Equation (4) results in the following equation.

$$q_s = \frac{p_o}{\frac{2\overline{p}_o}{\overline{q}_l}} + q_o = \frac{p_o}{Z_s} + q_o \tag{5}$$

Equation (5) indicates that the actual discharge flow rate $q_o$ from the hydraulic pump 210 is a function of the pump discharge pressure $p_0$, hydraulic damping $Z_s$, and discharge flow rate under rated condition $q_s$.

Observations from manual pump health diagnosis found that a loose or damaged piston shoe would result in a drop in the actual discharging flow, and a worn or damaged distributing disc would result in increased internal leakage and lead to a change in the pump hydraulic damping. Because it is often difficult to measure $q_s$ and $Z_s$ directly, the pump discharge pressure $p_o$ and the pump discharge flow rate $q_o$ can be selected as an indirect measurement reflecting the changes in $q_s$ and $Z_s$ (Eqn. (5)). Though a model of a specific type of hydraulic pump 210 has been described, the present invention is not to be limited to analyzing only this specific hydraulic pump type.

Given the pressure signal representative of the discharge pressure of the hydraulic pump 210, a wavelet analysis method is used for fault diagnosis. Generally, a wavelet analysis method decomposes spectral signals such as the pressure signal into windows in different frequency bands, and uses reference wavelets to characterize feature pressure signals within these windows. By this approach, fault diagnosis is performed according to the present invention by determining one or more appropriate reference wavelets to extract features from the pressure signals.

A general wavelet can be defined using the following equation:

$$\psi_{b,a}(t) = \frac{1}{\sqrt{a}}\psi\left(\frac{t-b}{a}\right) \tag{6}$$

and a continuous wavelet transformation is defined as:

$$WT(b, a) = \frac{1}{\sqrt{a}}\int_{-\infty}^{\infty}\psi\left(\frac{t-b}{a}\right)s(t)dt \tag{7}$$

where, a and b are the scale and shift factors of the wavelet function.

The scale parameter a scales the dimension of the window and the shift parameter b shifts the signal transformation window. By increasing a, the wavelet function reduces the time window, and vice versa. Therefore, wavelet analysis is capable of adapting the window dimension according to the signal frequency band. Parameter b, on the other hand, indicates the location of the wavelet window along the time axis. By adjusting both parameters a and b, an appropriate size and location time window results for accurate and consistent identification of characteristic fault signals. Such features of wavelet transform analysis can improve the sensitivity and robustness of spectral signal analysis based pump health diagnosis.

A general procedure in performing wavelet analysis is to first select one or more reference wavelets, and then compare located feature pressure signals with the reference wavelets using translated and dilated versions of the located feature pressure signals via shifting and scaling. There are many kinds of wavelets with different features, such as, but not limited to, the Harr wavelet, the Daubechies wavelet, the Morlet wavelet, and others, that can be selected as reference wavelets.

In fault diagnosis of the hydraulic pump 210, the wavelet transform is used to identify singularities within the original pressure signals. Normally, a spectral signal such as the pressure signal may contain both non-continuous and non-continuous differential singularities. The non-continuous singular signals have abrupt changes at some characteristic points, which result in signal discontinuities. The use of wavelet transform can easily locate such a singularity. Non-continuous differential singular signals have abrupt changes in the first-order differential of the original pressure signals. In such a case, wavelet decomposition is applied on sampled pressure signals to locate the singularity within certain frequency bands. Windows within these bands are used for evaluating the pressure signal.

A fault will result in specific singularities within a certain band. These faults are shown as variances in a wavelet coefficient, which is a coefficient indicating a difference or similarity between a feature pressure signal within a frequency band and the reference wavelet. The specific singularities cause corresponding wavelet coefficients to exceed their modular limits. If the reference wavelet represents a normally functioning pump, for example, a wavelet coefficient for the hydraulic pump 210 having a fault will exceed the maximum amplitude for healthy equipment for at least one frequency band. Hence, the fault can be detected and located via wavelet analysis.

In a preferred embodiment, a discrete wavelet transform (DWT) is used, and the signal from the pressure sensor 230 is digitally sampled by the processor 250 at discrete time steps to provide the pressure signal. By the DWT approach, the parameters, a,b, in Eqn. (6) are replaced using discrete values: $a=2^m, b=2^m n$, and the continuous wavelets, $\psi_{a,b}(t)$, are replaced by some orthonormal discrete wavelets: $2^{-m/2}\,\Omega(2^{-m}t-n)$, where m,n are scale factors within an integral space Z. The signal, f(t), is represented using the sum of its smooth approximation (low-pass) and its detailed description (band-pass):

$$f(t)=\sum_{n=-\infty}^{\infty}<f,\varphi_{m_0,n}(t)>\varphi_{m_0,n}(t)+\sum_{m=-\infty}^{m_0}\sum_{n=-\infty}^{\infty}<f,\psi_{m,n}(t)>\psi_{m,n}(t) \quad (8)$$

$$=P_{m_0}f(t)+\sum_{m=-\infty}^{m_0}D_m f(t)$$

where, $\phi(t)$ is a scaling function, $P_{m_0}f(t)$ is the coarser approximation of f(t) in scale $m_0$, and $D_m f(t)$ represents the differences among dilations.

When a signal satisfies the relationship $P_{m-1}f(t)=P_{m_0}f(t)+D_{m_0}f(t)$, it implies that the signal can be fine-scaled at $P_{m_0}f(t)=f_0$ and be decomposed into $f_0=P_{m_0+1}f(t)+D_{m_0+1}f(t)=f_1+d_1$, where $f_1$ is the next coarser approximation of $f_0$. The discrete model of wavelet analysis can therefore be represented as follows:

$$f_0=\sum_{n=-\infty}^{\infty}<f,\varphi_{0,n}(t)>\varphi_{0,n}(t)=\sum_{n=-\infty}^{\infty}a_{0,n}\varphi_{0,n}(t) \quad (9)$$

$$f_1=\sum_{n=-\infty}^{\infty}<f,\varphi_{1,n}(t)>\varphi_{1,n}(t)=\sum_{n=-\infty}^{\infty}a_{1,n}\varphi_{1,n}(t)$$

$$d_1=\sum_{n=-\infty}^{\infty}<f,\psi_{1,n}(t)>\psi_{1,n}(t)=\sum_{n=-\infty}^{\infty}cd_{1,n}\psi_{1,n}(t)$$

Using the same approach, $f_i$ can be further decomposed into $f_i=f_{i+}+d_{i+1}$, i=1,2, . . . .

Figure 3:
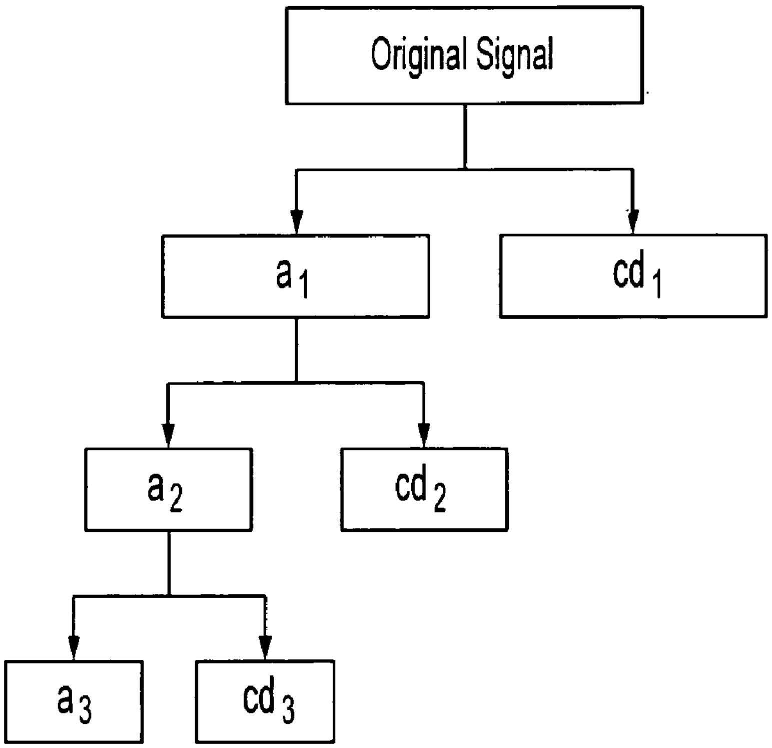
FIG. 3 is an illustration of a three-level wavelet decomposition of an original signal according to an embodiment of the present invention.

Based on this scheme, a set of examining signals such as pressure signals is decomposed using a low pass filter and a high pass filter, which results in two sets of sub-band signals. The sub-band signals are then reassembled to perform wavelet analysis. For example, when applying a three-level decomposition wavelet analysis to reassemble the original pressure signal, it will result in a wavelet coefficient vector, S, containing wavelet coefficients, $a_i$ and $cd_i$, in both low and high frequency windows of these decomposed levels. A diagram illustrating a three-level decomposition in this manner is shown in FIG. 3, including, from top to bottom underneath the original signal, levels 1, 2, and 3, respectively. In harmonic analysis, such a decomposition procedure is called a ‘two-channel’ sub-band filtering scheme. The wavelet coefficient vector S can be displayed using the following expression.

$$S=\{a_1,cd_1\} \quad (10)$$

$$=\{\{a_2,cd_2\},cd_1\}$$

$$=\{\{\{a_3,cd_3\},cd_2\},cd_1\}$$

Preferably, to improve the analysis efficiency, the entire bandwidth of the pressure signal is normalized to be 1, so that, in the example of a three-level decomposition, the corresponding frequency band windows for evaluating the low frequency wavelet coefficients $a_1$, $a_2$ and $a_3$ are 0~0.5, 0~0.25 and 0~0.125, and the corresponding frequency bands for evaluating the high frequency wavelet coefficients $cd_1$, $cd_2$ and $cd_3$ are 0.5~1, 0.25~0.5 and 0.125~0.25, respectively. As another example, for a ten-level decomposition, the first five high-frequency bands for determining high-frequency coefficients, would include 0.5–1, 0.25–0.5, 0.125–0.25, 0.0625–0.125, and 0.03125–0.0625, respectively.

Figures 4, 4A:
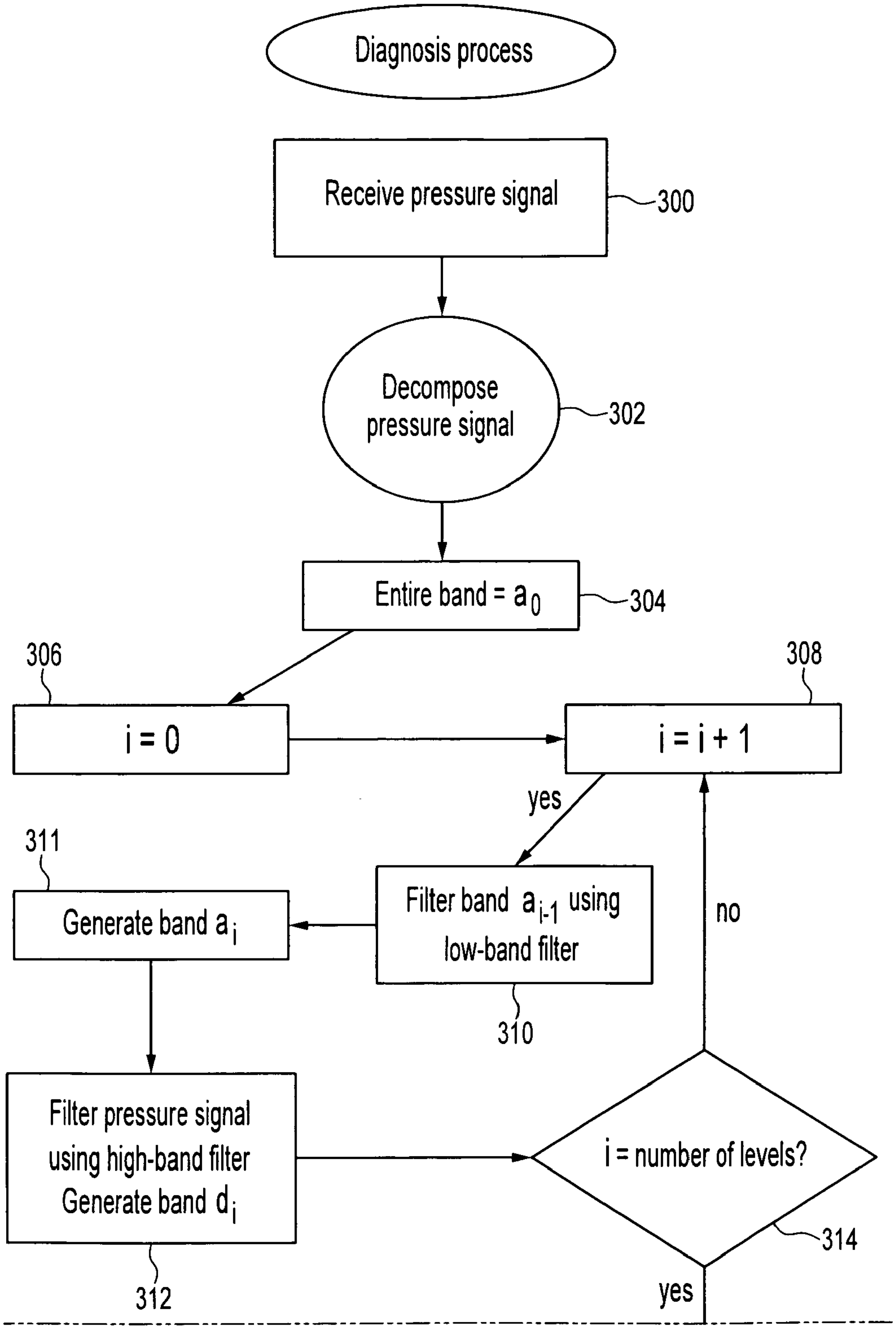
FIGS. 4A–4B together are a flowchart showing steps in a method for analyzing a hydraulic pump according to an exemplary embodiment of the present invention.
Figures 4, 4B:
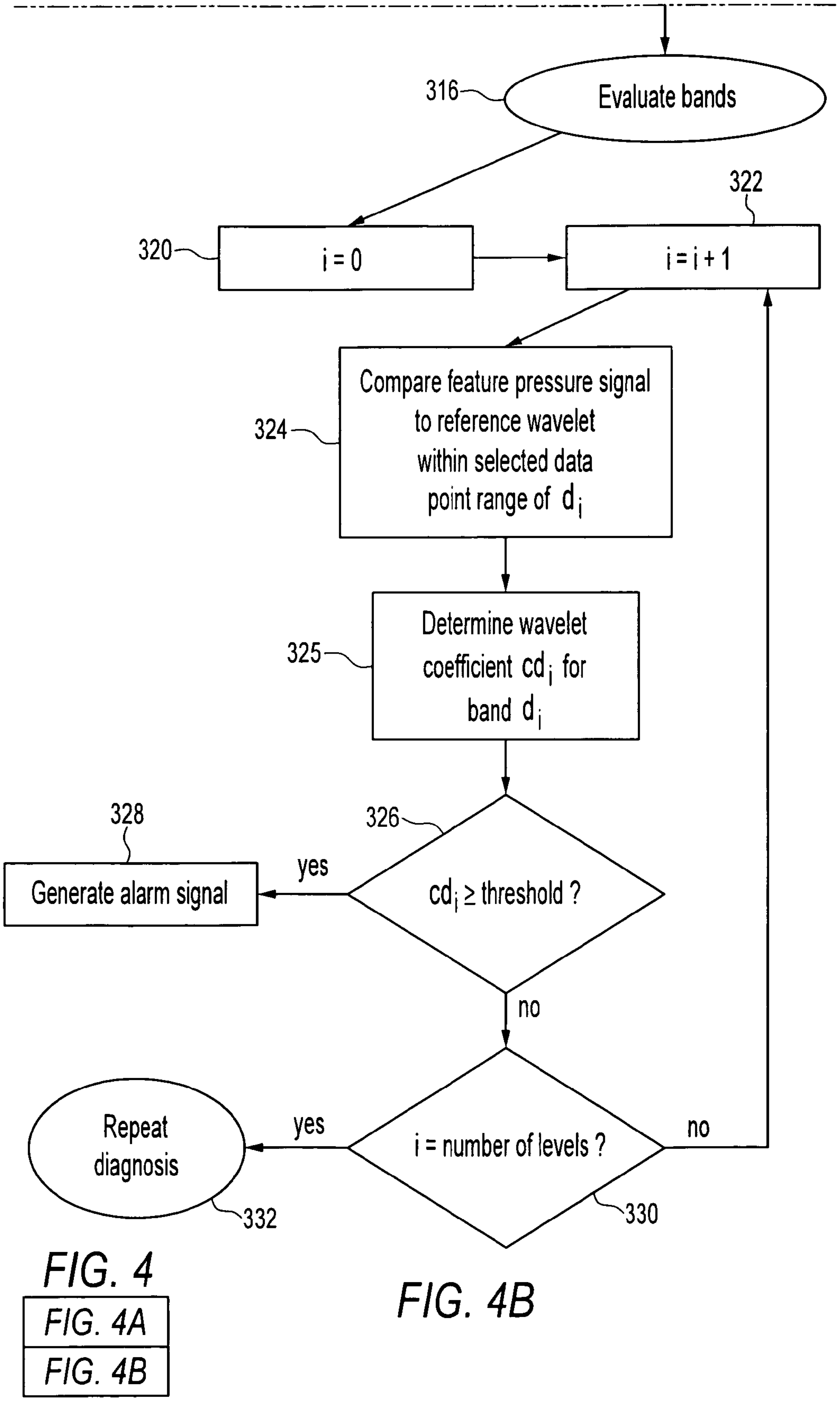

FIGS. 4A and 4B illustrate an exemplary, non-limiting method of diagnosing a fault in the hydraulic pump 210 using the pressure signal representative of the discharge pressure and DWT, according to the above description. The pressure signal is received by the processor (step 300), and may be tested, for example, by taking a covariance of the pressure signal, to determine if the pressure signal is reasonable. The pressure signal is decomposed into a number of decomposition levels (step 302). To decompose the pressure signal, for example, the entire frequency band is set to be band $a_0$ at a level zero (step 304). The level “i” is set to zero (step 306), and then incremented (step 308). For each level “i”, a low band filter, such as a digital filter embodied in the processor 250, filters the pressure signal (step 310) to produce a low-frequency band $a_i$ (step 311), and a high band filter, which also may be a digital filter, filters the pressure signal to produce a high-frequency band $d_i$ (step 312). When the desired number of decomposition levels is obtained (step 314), the processor 250 evaluates one or more of the frequency bands within windows using reference wavelets (step 316). It is possible, however, for evaluations of individual frequency bands to take place before the complete decomposition is completed.

Figure 5A:
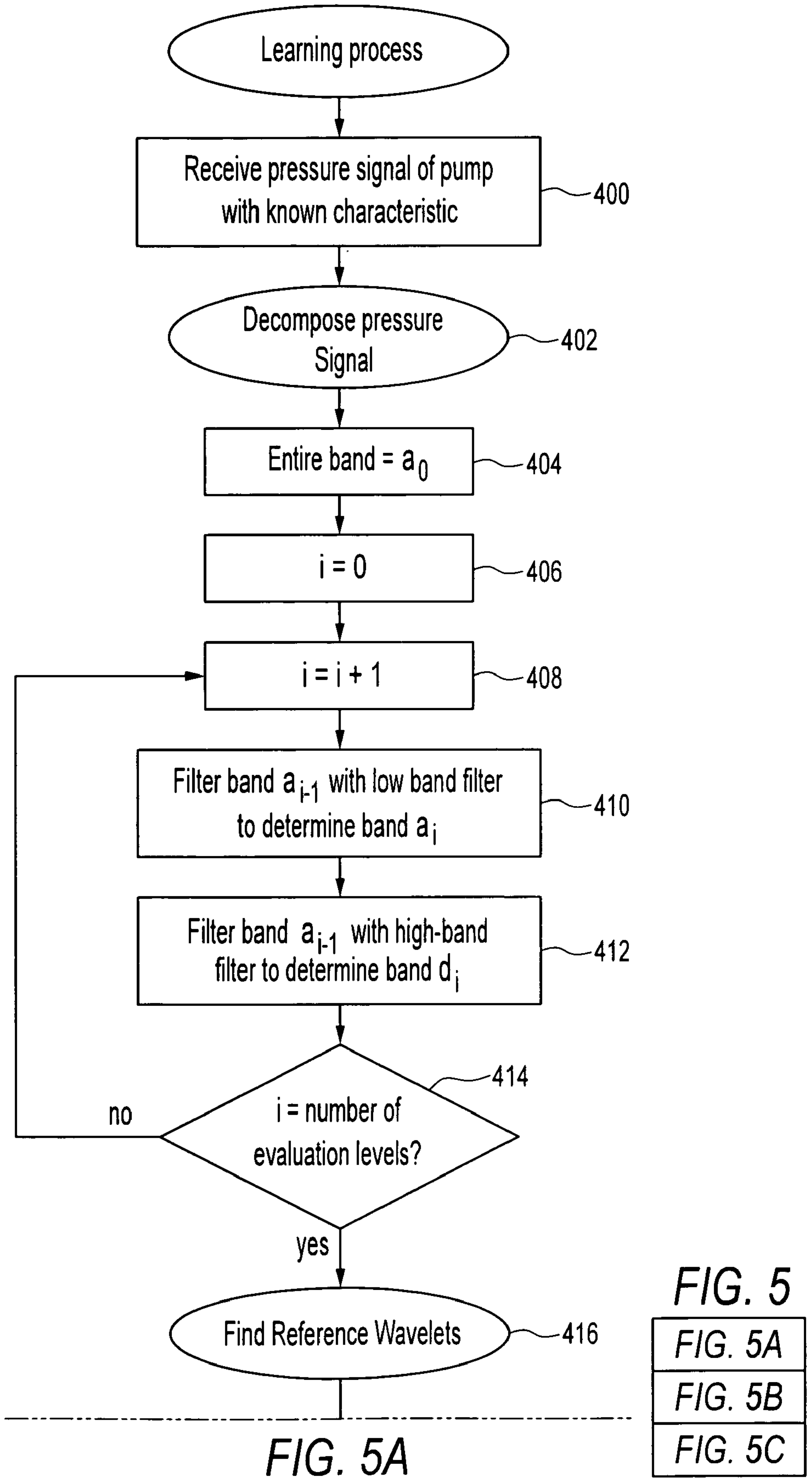
FIGS. 5A–5C together are a flowchart showing steps in a learning process for determining reference wavelets for diagnosis according to an exemplary embodiment of the present invention.
Figure 5B:
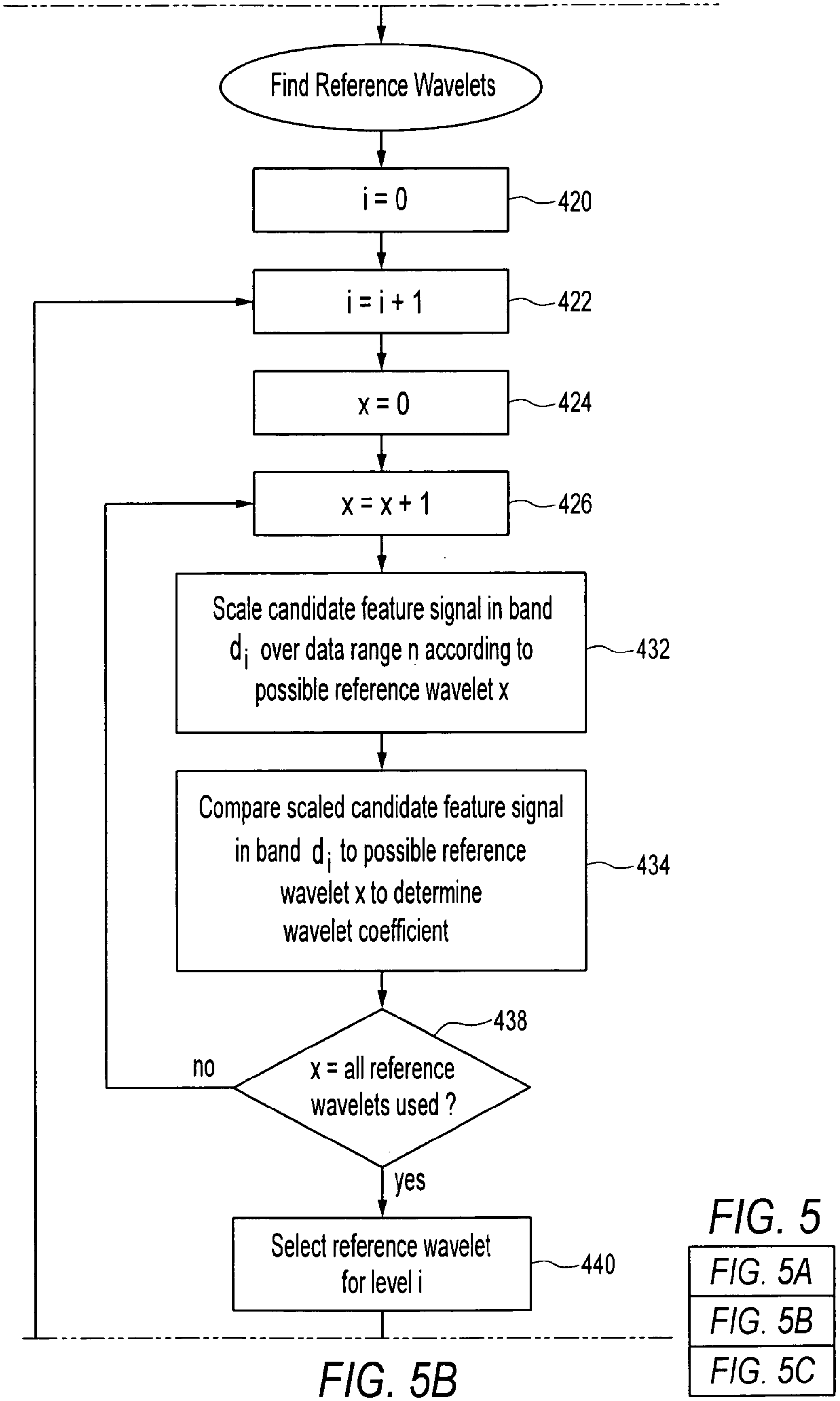
Figure 5C:
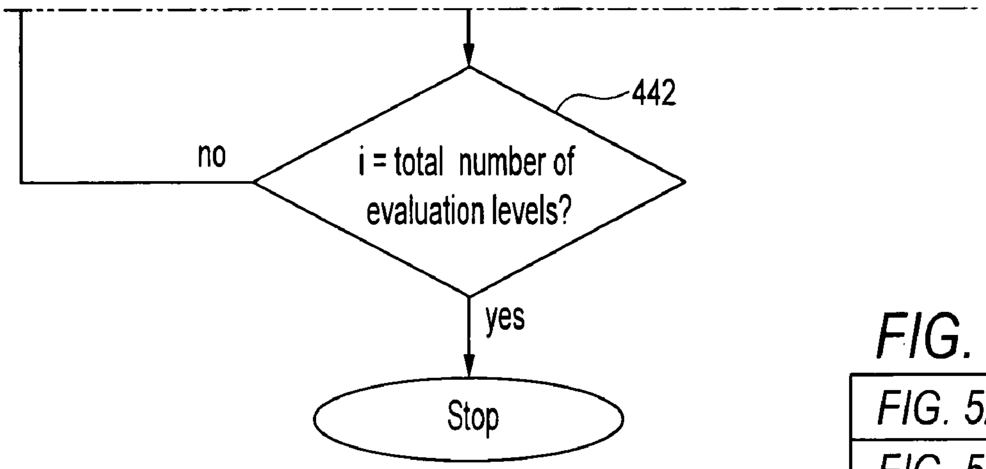
Figure 5:
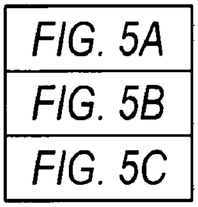

The number of decomposition levels needed for evaluation and the reference wavelets are determined according to a learning process, an example of which is illustrated in FIGS. 5A–5C. In the learning process, a default hydraulic pump is run having a known condition (such as a pump without defects, or a pump having particular, known faults) relating to a characteristic that is being evaluated in the tested hydraulic pump 210, and the pressure sensor 230 with the processor 250 provides a characteristic pressure signal representing the discharge pressure of the default hydraulic pump (step 400). The characteristic pressure signal is decomposed (step 402) into a number of evaluation levels (decomposition levels used during the learning process, which may be more or less than the number of levels used during diagnosis) and corresponding frequency bands, in a similar process to the diagnosis process shown in FIG. 4A. The number of evaluation levels can vary according to processing time, etc., but it has been found that ten evaluation levels are typically sufficient. Less than ten levels may also be considered.

In an exemplary, non-limiting method, the entire frequency band is set to be band $a_0$ (step 404). An evaluation level “i” is set to zero (step 406), and then incremented (step 408). For each evaluation level “i”, the low band filter filters the pressure signal to produce a low-frequency band $a_1$ (step 410), and a high band filter, which also may be a digital filter, filters the pressure signal to produce a high-frequency band $d_i$ (step 412).

After (or during) the decomposition, reference wavelets are selected, and feature pressure signals are identified as being similar to the reference wavelets. Individual feature pressure signals correspond to data point ranges within the decomposed frequency bands. Preferably, at least one reference wavelet is determined for each level "i" of decomposition. In an exemplary method, for one or more frequency bands of one or more decomposition levels, a feature pressure signal of the decomposed pressure signal within a particular data point range is identified that is similar to a standard wavelet (such as a particular Haar wavelet, Daubechies wavelet, Morlet wavelet, etc.). The standard wavelet chosen becomes the reference wavelet for that frequency band and, if only one frequency band is considered in a level, the reference wavelet for that level.

In an exemplary, non-limiting method of identifying the reference wavelet as shown in FIGS. 5B–5C, the level i is reset to zero (step 420) and incremented by one (step 422). Within each level, a number X, representing a particular possible reference wavelet (e.g., a particular standard wavelet), is reset (step 424) and incremented by one (step 426) to test each reference wavelet against candidate feature signals within a particular frequency band. The candidate feature signals are determined over a set of n data points within frequency bands.

The candidate feature signal for a data point range n is compared to possible reference wavelet X (step 434) to determine a wavelet coefficient, which represents the difference between them. In some cases, the candidate feature signal has a similar proportional pattern to the possible reference wavelet, for example, but different amplitude. To provide an accurate comparison, since the pattern of the wavelet is the most significant detection tool, a candidate feature signal may be scaled (step 432) before comparing. In a non-limiting example, if a possible reference wavelet varies between 10 and −10 (a distance of 20), and a candidate feature signal varies between 2 and −2 (a distance of 4), each of the set of data points of the candidate signal wavelet is multiplied by a scaling factor of 5 for comparison with the possible reference wavelet.

To compare the scaled candidate feature signal and the possible reference wavelet (step 434), similarities between candidate feature signals and possible reference wavelets are determined based on the wavelet coefficient. If the wavelet coefficient is substantially consistently within a relatively small band (for example, between −0.2~0.2), then the possible reference wavelet is selected as the reference wavelet. Since different possible reference wavelets are compared, the possible reference wavelet having the smallest wavelet coefficient band preferably is chosen as the reference wavelet.

When all possible reference wavelets have been considered (step 438), the reference wavelet and identified feature signal (i.e., a particular data range) are determined for the particular level (step 440). Once all levels have been considered (step 442), the learning process is completed.

In the exemplary method in FIGS. 5A–5C, only candidate feature signals within the high frequency band $d_i$ are compared to possible reference wavelets. However, it is contemplated that candidate feature signals within the low frequency band $a_i$ for each level may additionally or alternatively be compared and used as identified feature signals. In this case, there may be more than one reference wavelet for a particular level.

Referring again to FIG. 4B, the frequency bands for the diagnosing process (step 316) preferably are evaluated at each level. In the non-limiting method of FIG. 4B, the level number i is reset (step 320) and incremented (step 322). For each level (and band, if more than one is evaluated in a level), wavelet transform is conducted on the pressure signal based on the reference wavelet for that level (and possibly band), to determine a wavelet coefficient. Put another way, the pressure signal data at a particular decomposition level (and possibly band) is converted to a wavelet coefficient.

For example, the feature pressure signal (the pressure signal within an examining window having the same number of data points as the reference wavelet) within a particular frequency band (as shown by example, the high frequency band $d_i$) of the decomposed pressure signal is located (step 324) and compared to the reference wavelet for that level (step 325). The particular reference wavelet is determined by the learning process shown by example only in FIGS. 5A–5C. Based on the reference wavelet, a series of identified data points within the window will be identified within the frequency band as a data set.

The identified data set in the extracted feature pressure signal preferably is scaled based on the reference wavelet, and the scaled data set is used to perform a wavelet transform to determine the wavelet coefficients. For example, the wavelet coefficient $cd_i$ represents a similarity or difference for a high-frequency band at decomposition level i. Alternatively, a wavelet coefficient $a_i$ may represent a similarity or difference for a low-frequency band at decomposition level i.

Preferably, the wavelet coefficient is calculated so that the feature to be detected is present when the wavelet coefficient reaches or exceeds a certain threshold (step 304). A threshold can be established to determine whether a sufficient similarity or difference has been identified. For instance, if the wavelet coefficients of a normal signal are varying within a band c~−c, the wavelet coefficients of a malfunction signal will exceed c. Therefore, c can be the threshold. If the wavelet coefficient meets or exceeds the threshold (step 326), a determination of a fault is made, and an alarm signal may be produced (step 328) by a suitable alarm signal generator. By detecting the amount of similarity or difference, determinations can be made about the condition of the hydraulic pump 210.

For example, if the reference wavelet represents a normal hydraulic pump without defects, than a wavelet coefficient that exceeds a threshold signifying a difference between the located feature pressure signal and the reference wavelet indicates that the hydraulic pump 210 is not operating normally, i.e. a fault exists. Furthermore, as particular faults have corresponding signature patterns at certain frequency bands, a located feature pressure signal from a frequency band can be compared to a representative wavelet representative of that fault.

In an example of detecting a particular defect, the learning process is repeated for a pump having a known defect, such as a worn swash plate. One or more reference wavelets are found for one or more levels. Thus, during the diagnosis process, a separate wavelet transform is performed on a decomposed pressure signal to determine the wavelet coefficients (for particular levels and/or bands) representing the known defect. A pump exhibiting the known defect may have, for example, a wavelet coefficient within a band of 0.2~−0.2, where 0 equals complete similarity. If a threshold representing similarity between the located feature pressure signal of a pump to be tested and the reference wavelet exceeds a particular amount, for example, if the wavelet coefficient is within the band corresponding to the known defect, then a determination can be made that the hydraulic pump 210 exhibits the particular fault.

If, as is preferred, wavelet coefficients are determined for a plurality of levels, evaluations can be made at one or more of the levels to detect whether a threshold exists. For example, three wavelet coefficients for three corresponding levels of decomposition can be detected. When the desired number of levels has been considered (step 330), the diagnosis process may repeat (step 332) as many times as desired to provide an ongoing real-time diagnosis.

Accordingly, a preferred embodiment and method of the present invention can detect not only the presence of a fault in the hydraulic pump 210, but also the type or cause of the fault. In this way, appropriate action can be taken to prevent failure of the hydraulic pump 210 and/or the hydraulic system 200 before it occurs. Preferably, the signal provider generates a signal (step 328) if the threshold exceeds a particular value. By configuring the processor 250, the provided signal can be analyzed for both the presence of a fault and the type of fault, if one is detected.

Figure 6:
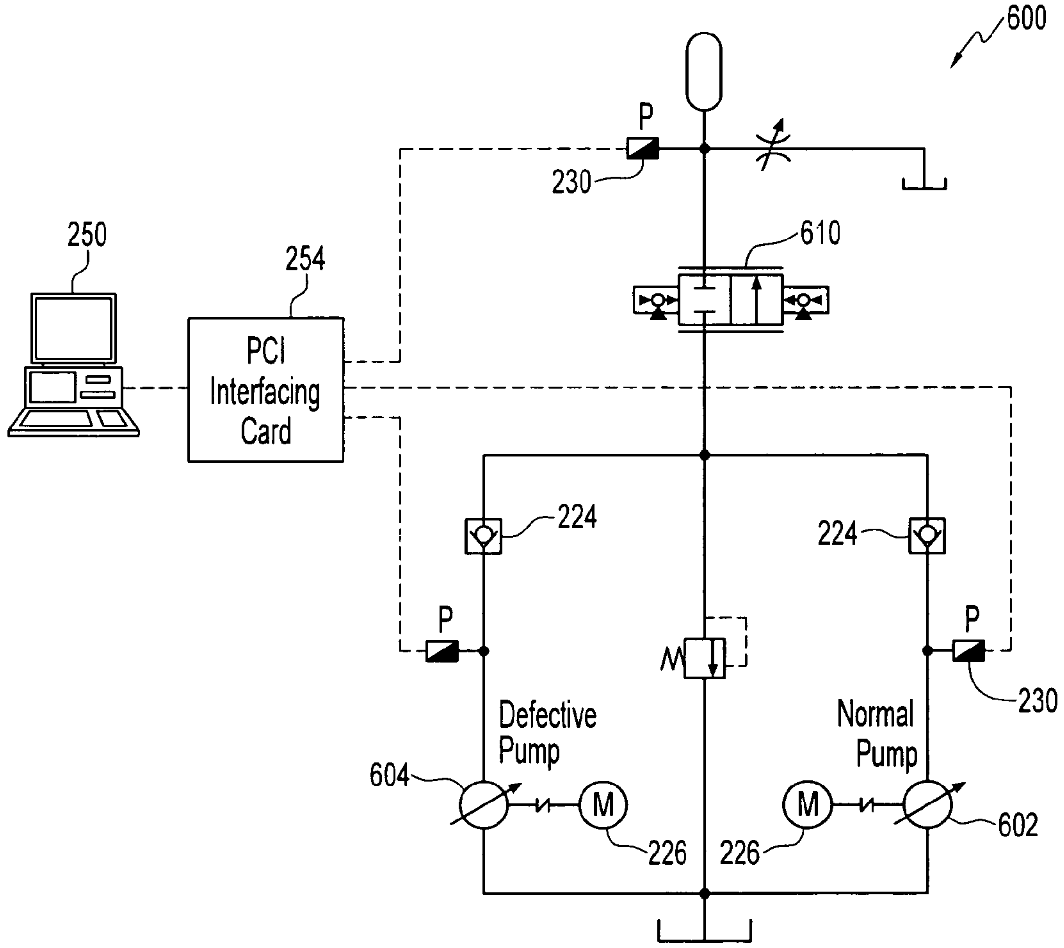
FIG. 6 shows an experimental setup for testing a normal hydraulic pump and a defective hydraulic pump according to an embodiment of the present invention.

In an exemplary embodiment, original discharge pressure signals from a normal pump and two defective pumps were decomposed into high frequency windows of $d_1$, $d_2$ and $d_3$ using Haar wavelets as the reference wavelets. Diagnosis was conducted on a laboratory scale hydraulic pump health diagnosis research platform, as shown in FIG. 6. In a testing hydraulic system 600, two testing pumps, a normal pump 602 and a defective pump 604, were installed in parallel. The pressure sensor 230 was installed on the discharge port of each pump 602, 604 to collect the discharge pressure signals. An electrohydraulic servo control valve 610 was also installed, and another pressure sensor 230 was installed as well. When one of the pumps 602, 604 was in testing, the other pump was shut off to avoid any possible inference to the discharge pressure of the testing pump.

Figure 7A:
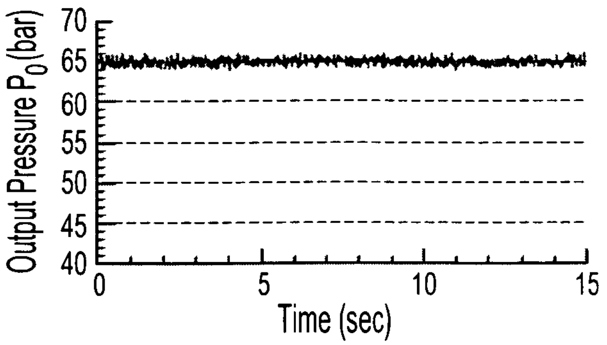
FIGS. 7A–7D show experimental results for a measured pump discharge pressure from a normal pump, including an original pressure signal and wavelet coefficients for layers 1, 2, and 3, respectively, according to an exemplary method of the present invention.
Figure 7B:
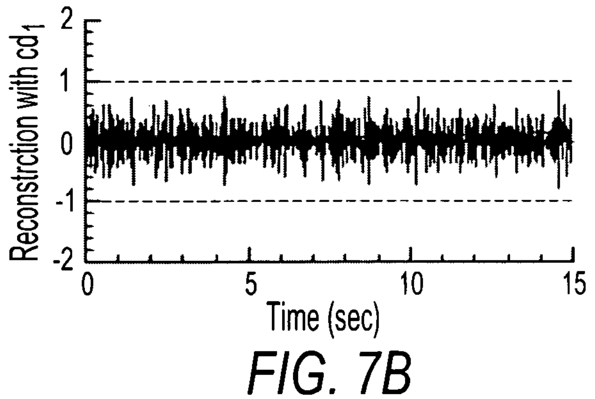
Figure 7C:
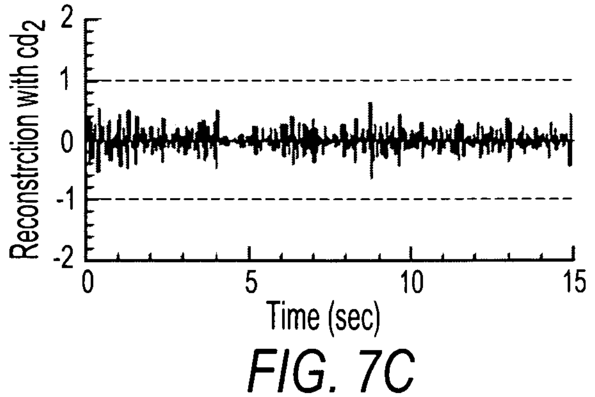
Figure 7D:
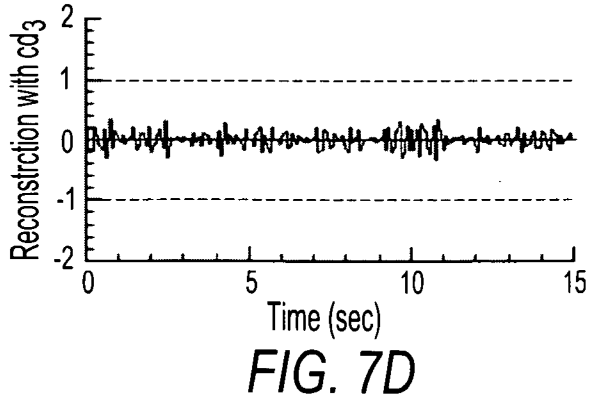

Under normal operating conditions, the pump discharge pressure will always have small fluctuations around its average pressure, and the variation of all wavelet coefficients within the high frequency bands considered should fall within normalized bands. FIG. 7A shows the pump discharge pressure signal obtained from the normal pump 602, and FIGS. 7B–7D show the three-level high frequency wavelet coefficients $cd_1$, $cd_2$, $cd_3$ from the pressure signal (using Haar wavelets as the reference wavelets). These results showed that the discharge pressure from the normal pump 602 was stable and its pulsation amplitude was low. The wavelet analysis results indicated that the variation of all three wavelet coefficients were within the −1 to +1 range.

FIGS. 8A–8D and 9A–9D show the test and analysis results obtained from a defective pump with loose piston shoes or a worn swash plate, respectively. Comparing the original signals shown in FIGS. 7A–7D, 8A–8D, and 9A–9D, the results indicated that the pulsations of the discharge pressures (FIGS. 7A, 8A, and 9A) from the pumps were very similar except for a slightly higher amplitude from the defective pumps. These results verified that the original pulsation pressure signals were not capable of providing sufficient information to support pump health diagnosis.

By comparison, the results from wavelet analysis (FIGS. 7B–7D, 8B–8D, and 9B–9D) indicated that there were remarkable differences between the wavelet coefficients $cd_1$, $cd_2$, $cd_3$ in all decomposed high frequency windows from defective pumps and from the normal pump. The resulting wavelet coefficients in all three windows from the normal pump exhibited relatively stable patterns, and the majority of the coefficient values were within the boundaries between −0.6 and +0.6 for $cd_1$ (FIG. 7B), between −0.4 and +0.4 for $cd_2$ (FIG. 7C), and between −0.3 and +0.3 for $cd_3$ (FIG. 7D).

Figure 8A:
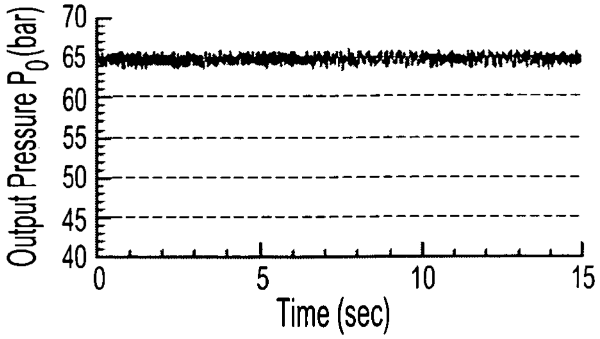
FIGS. 8A–8D show experimental results for a measured pump discharge pressure from a defective pump with loose piston shoes, including an original pressure signal and wavelet coefficients for layers 1, 2, and 3, respectively.
Figure 8B:
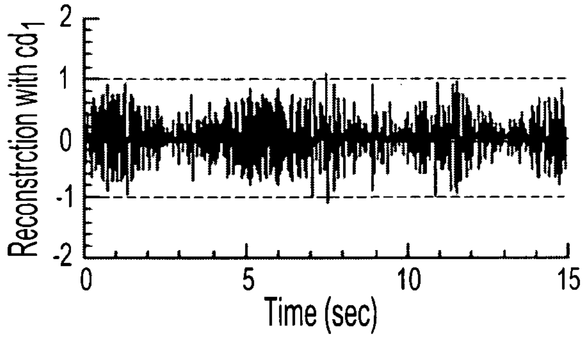
Figure 8C:
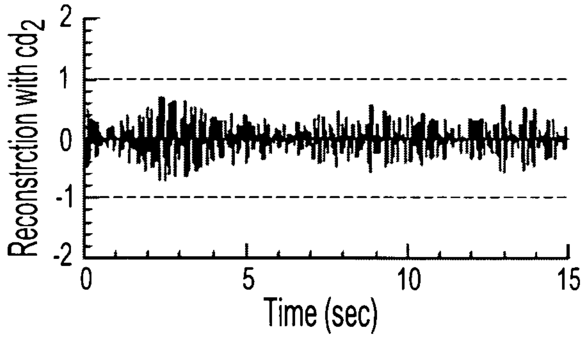
Figure 8D:
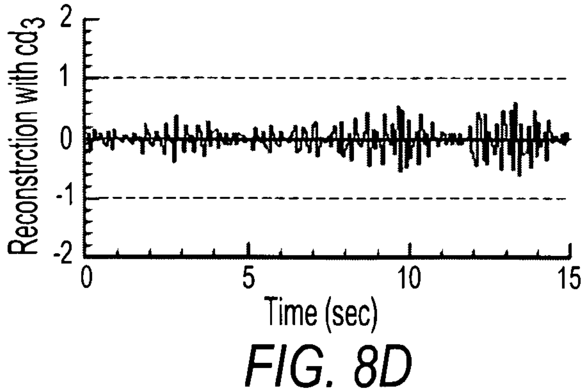

When a pump had loose piston shoes, the wavelet coefficients exhibited a harmonic pattern in all three layers. In addition, the amplitudes of these coefficients were also increased to between −0.8 and +0.8 for $cd_1$ (FIG. 8B), between −0.7 and +0.7 for $cd_2$ (FIG. 8C), and between −0.6 and +0.6 for $cd_3$ (FIG. 8D). Such changes in the obtained higher wavelet coefficients clearly indicated a deviation from normal pump coefficients and therefore can be used to identify a pump defect.

Figure 9A:
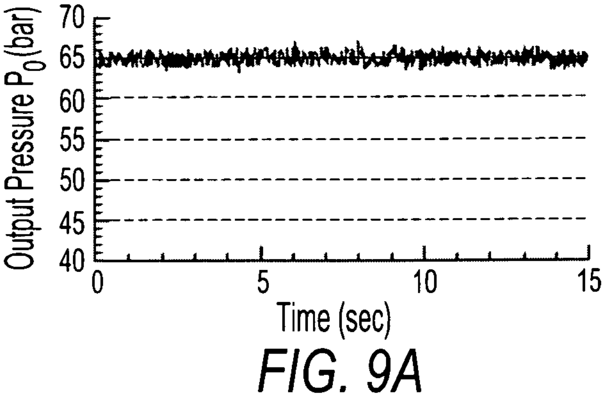
FIGS. 9A–9D show experimental results for a measured pump discharge pressure from a defective pump with a worn swashing plate, including an original pressure signal and wavelet coefficients for layers 1, 2, and 3, respectively.
Figure 9B:
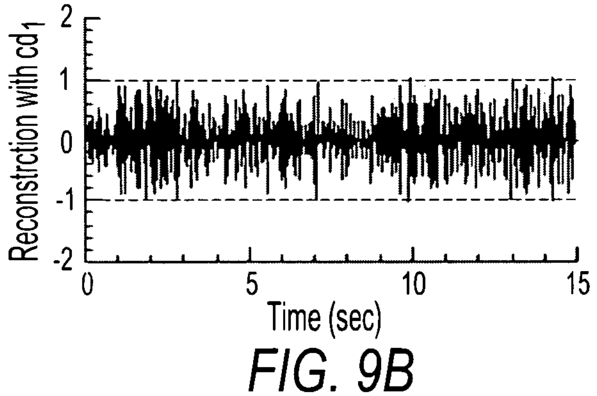
Figure 9C:
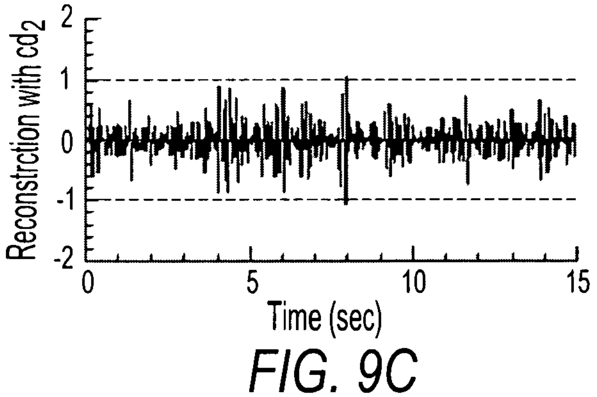
Figure 9D:
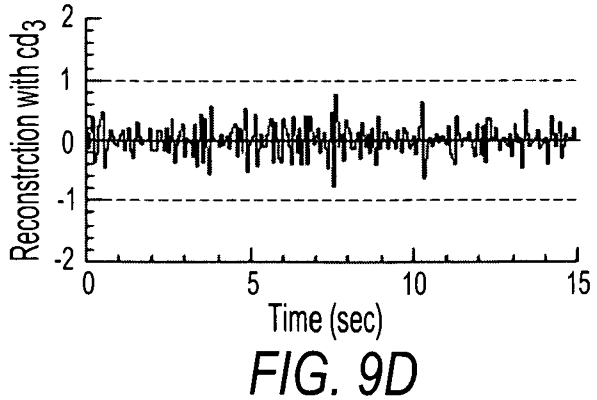

For the pump having a worn swashing plate, the wavelet coefficients did not show a harmonic pattern as had been seen from a pump with loose piston shoes. However, the amplitudes of these coefficients were consistently higher than those from the normal pump (between −0.9 and +0.9 for $cd_1$ (FIG. 9B), between −0.8 and +0.8 for $cd_2$ (FIG. 9C), and between −0.5 and +0.5 for $cd_3$ (FIG. 9D). The results obtained from both defective pumps indicated that the wavelet coefficients obtained from three high frequency windows changed when a different type of defect occurred. Furthermore, the patterns of the coefficient changes were different for different types of pump defects.

As shown in this example, the original pulsation pressure signals (FIGS. 7A, 8A, and 9A) from the pumps 602, 604 were very similar, and thus were substantially uninformative for reliable health diagnosis for hydraulic pumps. However, by decomposing the provided signals into located feature pressure signals and comparing them with the reference wavelet, as shown by the wavelet coefficients $cd_1$, $cd_2$, $cd_3$ (FIGS. 7B–7D, 8B–8D, and 9B–9D), distinguishable changes can be found between wavelet coefficients for both the normal pump 602 and the defective hydraulic pump 604. These differences also provide distinguishable features that can be used to identify particular pump defects. Accordingly, the wavelet analysis method according to the present invention can improve the capability of diagnosing the health conditions of hydraulic pumps by decomposing the original pulsation pressure signals. Furthermore, the patterns and the amplitudes of wavelet coefficients obtained from different decomposed signal windows can be used to assess the types of hydraulic pump defects.

While various embodiments of the present invention have been shown and described, it should be understood that other modifications, substitutions, and alternatives are apparent to one of ordinary skill in the art. Such modifications, substitutions, and alternatives can be made without departing from the spirit and scope of the invention, which should be determined from the appended claims.

Various features of the invention are set forth in the appended claims.

What is claimed is:

1. A method of analyzing a hydraulic pump in real-time, the method comprising:

providing a pressure signal representing a discharge pressure of the hydraulic pump;

decomposing the pressure signal into a plurality of levels, each of the plurality of levels having at least one frequency band;

locating a feature pressure signal in at least one of the frequency bands;

comparing the located feature pressure signal wavelet to a reference.

2. The method of claim 1 wherein said comparing comprises:

determining a wavelet coefficient between the feature pressure signal and the reference wavelet.

3. The method of claim 1 wherein said comparing comprises:

performing wavelet transform on the feature pressure signal.

4. The method of claim 2 further comprising:

identifying a fault in the hydraulic pump if the wavelet coefficient exceeds a predetermined threshold, wherein the threshold comprises a wavelet coefficient representing an amount of difference between a feature pressure signal of a hydraulic pump not having the fault, and the reference wavelet.

5. The method of claim 1 wherein the reference wavelet is selected by:

providing a characteristic pressure signal representing discharge pressure of a hydraulic pump having a known condition;

decomposing the provided characteristic pressure signal into a plurality of levels, each of the levels having at least one frequency band;

determining the reference wavelet, wherein the reference wavelet is similar to a number of data points within at least one of the frequency bands.

6. The method of claim 5 wherein said determining the reference wavelet comprises:

identifying at least one candidate feature signal, each of the at least one candidate feature signals being for a range of data points within at least one of the frequency bands;

determining a difference between each of the at least one candidate feature signals and the reference wavelet;

identifying the reference wavelet having the smallest difference from one of the identified candidate feature signals.

7. The method of claim 2 further comprising:

at least one of scaling and shifting the located feature pressure signal before said step of determining a wavelet coefficient;

wherein said step of determining comprises determining a wavelet coefficient between the scaled and/or shifted feature pressure signal and the reference wavelet.

8. The method of claim 1 wherein the frequency band comprises a high-frequency band for the decomposition level.

9. The method of claim 1 wherein said providing comprises receiving a direct discharge pressure from the pump.

10. The method of claim 1 wherein the discharge pressure comprises pulsation discharge pressure of the pump.

11. The method of claim 1 wherein the step of providing comprises:

providing a pressure sensor in fluid communication with a discharge port of a hydraulic pump;

receiving pulsation discharge pressure from the hydraulic pump;

generating the evaluating signal.

12. The method of claim 10 wherein the pump comprises an axial piston fixed displacement hydraulic pump.

13. The method of claim 11 wherein the pressure sensor is installed on the discharge port of the pump.

14. The method of claim 1 wherein the reference wavelet comprises at least one of a Harr wavelet, a Daubechies wavelet, and a Morlet wavelet.

15. The method of claim 1 wherein the pressure signal is sampled at discrete data points associated with discrete time steps.

16. The method of claim 1 wherein said step of decomposing comprises:

filtering the pressure signal using a low pass filter and a high pass filter.

17. An apparatus for identifying a defect in a hydraulic system comprising:

a pressure sensor in fluid communication with a discharge port of a hydraulic pump of the hydraulic system, the pressure sensor being configured to produce a pressure signal in response to a received pulsation discharge pressure;

a processor coupled to the pressure sensor, the processor being configured to:

receive the pressure signal;

decompose the pressure signal into a plurality of levels, each of the plurality of levels having at least one frequency band;

locate a feature pressure signal in at least one of the frequency bands;

compare the located feature pressure signal to a reference wavelet.

18. A hydraulic system comprising:

a hydraulic pump configured to distribute a fluid through at least one passage;

a pressure sensor in fluid communication with a discharge port of a hydraulic pump of the hydraulic system, the pressure sensor being configured to produce a pressure signal in response to a received pulsation discharge pressure;

a processor coupled to the pressure sensor, the processor being configured to:

receive the pressure signal;

decompose the pressure signal into a plurality of levels, each of the plurality of levels having at least one frequency band;

locate a feature pressure signal in at least one of the frequency bands;

compare the located feature pressure signal wavelet to a reference.

* * * * *

UNITED STATES PATENT AND TRADEMARK OFFICE

CERTIFICATE OF CORRECTION

PATENT NO. : 7,013,223 B1
APPLICATION NO. : 10/671434
DATED : March 14, 2006
INVENTOR(S) : Zhang et al.

It is certified that error appears in the above-identified patent and that said Letters Patent is hereby corrected as shown below:

On the title page, item [57]:

Abstract, page 1, line 8, after "pump" please delete "and/or a type" and insert --and/or the type-- therefor.

On the title page, item [56]:

Page 2, column 2, line 44, after "and" please delete "R. Due," and insert --R. Du,-- therefor.

Column 12, line 66, after "pressure" please delete "signal wavelet to" and insert --signal to-- therefor.

Signed and Sealed this

First Day of August, 2006

JON W. DUDAS

*Director of the United States Patent and Trademark Office*